(12) United States Patent
Knapik et al.

(10) Patent No.: US 12,129,372 B2
(45) Date of Patent: Oct. 29, 2024

(54) POWDER PARTICULATES COMPRISING A WATER-SOLUBLE POLYMER AND PRODUCTION THEREOF BY MELT EMULSIFICATION

(71) Applicant: Xerox Corporation, Norwalk, CT (US)

(72) Inventors: Benjamin John Knapik, Etobicoke (CA); David John William Lawton, Burlington (CA)

(73) Assignee: Xerox Corporation, Norwalk, CT (US)

( * ) Notice: Subject to any disclaimer, the term of this patent is extended or adjusted under 35 U.S.C. 154(b) by 408 days.

(21) Appl. No.: 17/411,286

(22) Filed: Aug. 25, 2021

(65) Prior Publication Data
US 2023/0060436 A1   Mar. 2, 2023

(51) Int. Cl.
*C08L 29/04* (2006.01)
*C08K 3/36* (2006.01)
*C08K 7/18* (2006.01)

(52) U.S. Cl.
CPC .............. *C08L 29/04* (2013.01); *C08K 3/36* (2013.01); *C08K 7/18* (2013.01); *C08K 2201/003* (2013.01); *C08K 2201/011* (2013.01)

(58) Field of Classification Search
CPC .. C08L 29/04; C08K 3/36; C08K 7/18; C08K 2201/003; C08K 2201/011
See application file for complete search history.

(56) References Cited

U.S. PATENT DOCUMENTS

2019/0010354 A1* 1/2019 Jing ..................... C08K 3/36
2021/0070993 A1 3/2021 Farrugia et al.

FOREIGN PATENT DOCUMENTS

| EP | 3705509 A1 | 9/2020 | |
| EP | 3789428 A1 | 3/2021 | |
| EP | 3789442 A1 * | 3/2021 | ........... B29C 64/106 |
| EP | 3789443 A1 | 3/2021 | |
| EP | 3812417 A1 | 4/2021 | |

OTHER PUBLICATIONS

Extended European Search Report of corresponding EP Application No. 22190320.6 mailed Jan. 16, 2023.
Khadka, P., et al., "Pharmaceutical particle technologies: An approach to improve drug solubility, dissolution, and bioavailability," Asian Journal of Pharmaceutical Sciences, 2014, pp. 304-316, 9.
Muppalaneni, S., et al., "Polyvinyl Alcohol in Medicine and Pharmacy: A Perspective," Journal of Developing Drugs, 2013, 1000112 (5 pages), 2.
Da Costa Neto, B.D., et al., "Preparation and evaluation of chitosan—hydrophobic silica composite microspheres: Role of hydrophobic silica in modifying their properties," 2014, Powder Technology, pp. 109-119, 255.
Suttiruengwong, S., et al., "Hydrophilic and Hydrophobic Mesoporous Silica Derived from Rice Husk Ash as a Potential Drug Carrier," Materials, 2018, 1142 (11 pages).
Thanoo, B, et al., "Controlled Release of Oral Drugs from Cross-linked Polyvinyl Alcohol Microspheres," J. Pharm. Pharmacol., 1993, 16-20.

* cited by examiner

*Primary Examiner* — Robert D Harlan
(74) *Attorney, Agent, or Firm* — Vorys, Sater, Seymour and Pease LLP

(57) ABSTRACT

Powder particulates comprising a water-soluble polymer may be formed by melt emulsification. Compositions comprising powder particulates may comprise a plurality of particulates comprising a water-soluble polymer and a plurality of nanoparticles, the water-soluble polymer defining at least an outer surface of the particulates and at least a majority of the plurality of nanoparticles being disposed upon the outer surface.

20 Claims, 2 Drawing Sheets

POWDER PARTICULATES COMPRISING A WATER-SOLUBLE POLYMER AND PRODUCTION THEREOF BY MELT EMULSIFICATION

FIELD

The present disclosure relates to powder particulates comprising a water-soluble polymer.

BACKGROUND

Water-soluble polymers, including natural and synthetic polymers, are substances that dissolve, disperse, or swell in water and may modify the physical properties of aqueous systems through gelation, thickening, or emulsification/stabilization. Water-soluble polymers have a wide range of industrial applications as additives in products and applications such as, for example, food, pharmaceuticals (including as a drug delivery vehicle), biomedical agents, paints, textiles, papers, construction materials, adhesives, coatings, and water treatment. For example, polyvinyl alcohol is a frequently used polymer for drug delivery due to its ready dissolution and ability to disperse or solubilize a range of substances therein.

It is sometimes desirable to utilize water-soluble polymers in particulate form. However, because of their hydrophilic nature and high surface area, it may be difficult to handle water-soluble polymer particulates. For example, water-soluble polymer particulates may clump together and/or be hygroscopic. Moreover, once deployed in a product or in an application, the water-soluble polymer particulates may dissolve more rapidly than desired. These issues may complicate use of the water-soluble polymer particulates in various products and applications.

SUMMARY

The present disclosure generally relates to powder particulates comprising a water-soluble polymer and, more specifically, to powder particulates comprising a water-soluble polymer and a surface additive that allows tuning of the particulate dissolution rate.

In some embodiments, the present disclosure provides powder particulate compositions comprising: a plurality of particulates comprising a water-soluble polymer and a plurality of nanoparticles, the water-soluble polymer defining at least an outer surface of the particulates and at least a majority of the plurality of nanoparticles being disposed upon the outer surface.

In some embodiments, the present disclosure provides powder particulate compositions comprising polyvinyl alcohol. The powder particulate compositions comprise: a plurality of particulates comprising a polyvinyl alcohol and a plurality of silica nanoparticles that are hydrophobically functionalized, the polyvinyl alcohol defining at least an outer surface of the particulates and at least a majority of the plurality of silica nanoparticles being disposed upon the outer surface; wherein the particulates are substantially spherical and have an average size ($D_{50}$) ranging from about 1 μm to about 150 μm with a geometric standard deviation (GSD) of about 3 or less.

In still other embodiments, methods for making powder particulate compositions comprise: combining a water-soluble polymer and nanoparticles with a carrier fluid at a heating temperature at or above a melting point or softening temperature of the water-soluble polymer; wherein the water-soluble polymer and the carrier fluid are substantially immiscible at the heating temperature; applying sufficient shear to disperse the water-soluble polymer as liquefied droplets in the carrier fluid at the heating temperature in the presence of the nanoparticles; after liquefied droplets have formed, cooling the carrier fluid to at least a temperature at which particulates in a solidified state form, the particulates comprising the water-soluble polymer and a plurality of the nanoparticles, the water-soluble polymer defining at least an outer surface of the particulates and at least a majority of the plurality of the nanoparticles being disposed upon the outer surface; and separating the particulates from the carrier fluid.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
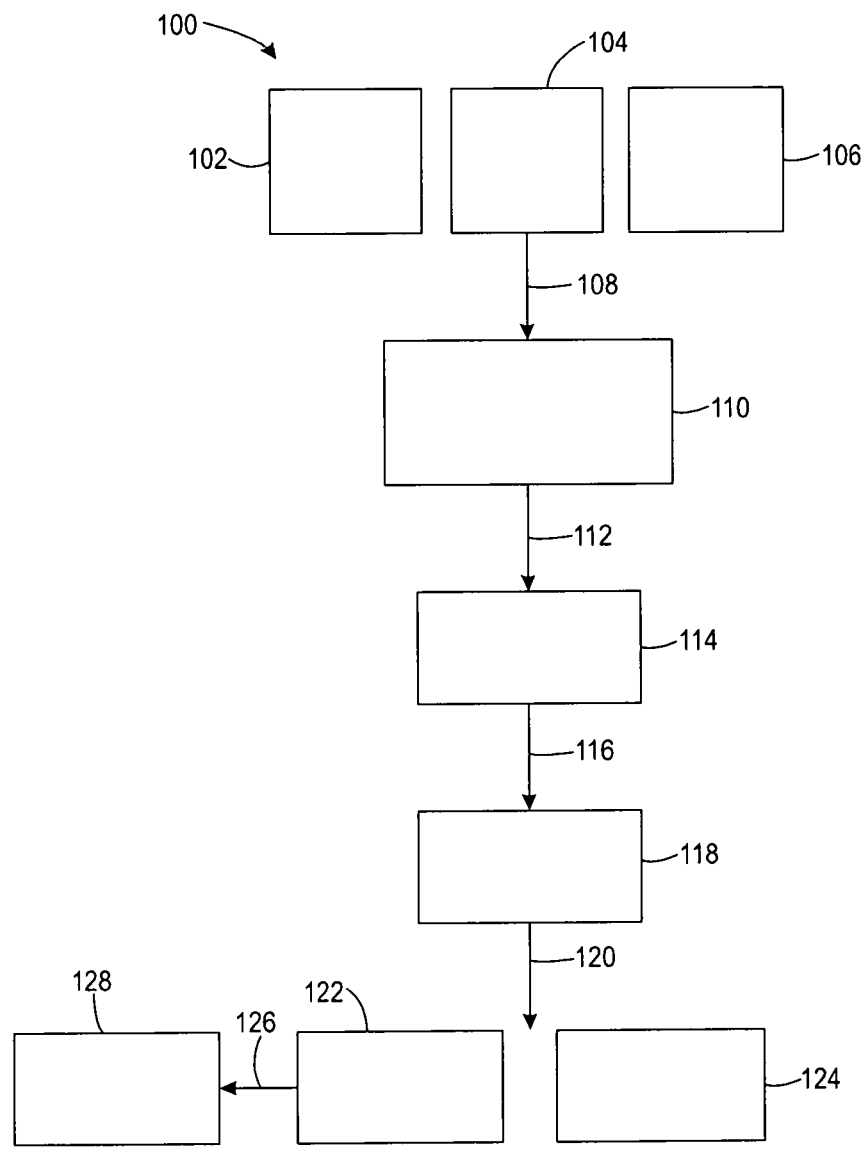
FIG. 1 is a flow diagram of a non-limiting example method for producing powder particulates in accordance with the present disclosure.

The present disclosure generally relates to powder particulates comprising a water-soluble polymer and, more specifically, to powder particulates comprising a water-soluble polymer and a surface additive that allows tuning of the particulate dissolution rate.

Advantageously, the present disclosure provides powder particulates comprising a water-soluble polymer that are much more easily handled than are conventional water-soluble polymers, especially in powder particulate form. The powder particulates comprise a plurality of particulates comprising a water-soluble polymer and a plurality of nanoparticles, in which the water-soluble polymer defines at least an outer surface of the particulates and at least a majority of the plurality of nanoparticles are disposed upon the outer surface. The surface coating of nanoparticles may lessen handling issues and slow the dissolution rate of such powder particulates. Moreover, by adjusting the loading of nanoparticles upon the powder particulates, the dissolution rate may be tailored over a range of values.

The nanoparticles facilitating tailored dissolution properties of the water-soluble polymer may be readily incorporated upon the surface of the powder particulates through melt emulsification, as described in further detail herein. The loading of nanoparticles upon the powder particulates may be readily adjusted during melt emulsification, and the nanoparticle loading may further influence the size distribution of the powder particulates that are obtained. Thus, melt emulsification may afford powder particulates of a water-soluble polymer over a range of particle sizes and dissolution rates. In particular examples, tailored incorporation of a hydrophobic surface additive, such as hydrophobic silica, in the melt emulsification medium may facilitate control the dissolution rate of the water-soluble particles in water and may improve the stability of the powder particulates under acidic environments. A higher coverage of the surface of the powder particles may decrease the dissolution rate of the water-soluble polymer and increase the stability of the powder particulates.

Further advantageously, powder particulates formed by melt emulsification may have excellent shape regularity (substantially spherical) and a narrow particle size distribution. Moreover, the powder particulates of the present disclosure may be readily sieved and exhibit good powder flow characteristics. Because of their shape regularity, the powder particulates disclosed herein may be advantageous for use in various applications where rigorous particle size control is desirable, such as in the pharmaceutical and biomedical industries.

The powder particulates of the present disclosure having these properties may be produced through modified melt emulsification processes. Unlike conventional melt emulsification processes, a sufficient amount of nanoparticles, particularly oxide nanoparticles, may be incorporated with the water-soluble polymer in the melt emulsification medium (carrier fluid), such that a uniform coating of the nanoparticles results upon the powder particulates as the powder particulates solidify from the melt emulsification medium upon cooling. Silica nanoparticles, particularly hydrophobically functionalized silica nanoparticles, are among the oxide nanoparticles suitable for use in the disclosure herein. The nanoparticles may function as an emulsion stabilizer during melt emulsification to form a coating upon the powder particulates to improve the powder flow properties and/or alter the particle size distribution in a desired way. Advantageously, the nanoparticle coating may lead to good powder flow characteristics as a solid, provide a narrow particle size distribution, and afford controlled dissolution performance.

A further advantage of the present disclosure is that nanoparticles do not have to be dry blended with the powder particulates in a separate blending process, thereby defining two discrete particulate processing steps: 1) particulate formation and 2) particulate modification by dry blending. Conventional melt emulsification processes, in contrast, may blend silica with the particulates post-production as a flow aid. Not only is a separate blending operation process-inefficient, but poor uniformity of coverage and non-robust adherence of the flow aid to the powder particulates may occur. Including nanoparticles in the melt emulsification medium according to the present disclosure may address these issues and provide related advantages, such as control of the particulate size and dissolution rate. Since dry blending processes do not lead to incorporation of a robust nanoparticle coating upon a surface of the particulates, different particulate characteristics may result, such as performance differences during dissolution, agglomeration, and size polydispersity.

Terms used in the description and claims herein have their plain and ordinary meaning, except as modified by the paragraphs below.

As used herein, the term "nanoparticle" refers to a particulate material having a particle size ranging from about 1 nm to about 500 nm.

As used herein, the term "oxide" refers to both metal oxides and non-metal oxides. For purposes of the present disclosure, silicon is considered to be a metal.

As used herein, the term "oxide nanoparticles" refers to a particulate material having a particle size ranging from about 1 nm to about 500 nm and comprising a metal oxide or a non-metal oxide.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherence via hydrogen bonding and/or other mechanisms. However, chemical bonding may be occurring to some degree.

As used herein, the term "embed" relative to nanoparticles and a surface of a polymer particle refers to the nanoparticle being at least partially extended into the surface such that polymer is in contact with the nanoparticle to a greater degree than would occur if the nanoparticle were simply laid on the surface of the polymer particle.

As used herein, the term "$D_{10}$" refers to a diameter at with 10% of the sample (on a volume basis unless otherwise specified) is comprised of particles having a diameter less than said diameter value. As used herein, the term "$D_{50}$" refers to a diameter at with 50% of the sample (on a volume basis unless otherwise specified) is comprised of particles having a diameter less than said diameter value. $D_{50}$ may also be referred to as the "average particle size." As used herein, the term "$D_{90}$" refers to a diameter at with 90% of the sample (on a volume basis unless otherwise specified) is comprised of particles having a diameter less than said diameter value.

As used herein, the terms "diameter span," "size span" and "span" refer to the breadth of a particle size distribution and may be calculated by the relation $(D_{90}-D_{10})/D_{50}$ (again each D-value being based on volume unless otherwise specified).

As used herein, the term "shear" refers to stirring or a similar process that induces mechanical agitation in a fluid.

As used herein, the term "aspect ratio" refers to length divided by width, wherein the length is greater than the width.

FIG. 1 is a flow diagram of non-limiting example method 100 for producing powder particulates in accordance with the present disclosure. As shown, water-soluble polymer 102, carrier fluid 104, and emulsion stabilizer 106 are combined 108 to produce mixture 110. Water-soluble polymer 102, carrier fluid 104, and emulsion stabilizer 106 may be combined 108, individually or in a blend of components in any order, and include mixing and/or heating during the process of being combined 108. In some examples, carrier fluid 104 may be heated above a melting point or softening temperature of water-soluble polymer 102 before combining water-soluble polymer 102 and emulsion stabilizer 106 therewith. Emulsion stabilizer 106 may comprise a plurality of nanoparticles, such as a plurality of oxide nanoparticles. In emulsion stabilizer 106, one or more types of nanoparticles may be present in any combination and ratio.

Heating above the melting point or softening temperature of water-soluble polymer 102 may be at any temperature below the decomposition temperature or boiling point of any of the components in the melt emulsion. In non-limiting examples, heating at a temperature about 1° C. to about 50° C., or about 1° C. to about 25° ° C., or about 5° C. to about 30° C., or about 20° ° C. to about 50° C. above the melting point or softening temperature of water-soluble polymer 102 may be conducted. In the disclosure herein, melting points may be determined by ASTM E794-06(2018) with 10° C./min ramping and cooling rates. The softening temperature or softening point of a polymer, unless otherwise specified, may be determined by ASTM D6090-17. The softening temperature can be measured by using a cup and ball apparatus available from Mettler-Toledo using a 0.50 gram sample with a heating rate of 1° C./min. Melting points or softening temperatures in the present disclosure may range from about 50° C. to about 400° C.

Water-soluble polymer 102 may have a glass transition temperature (ASTM E1356-08(2014) with 10° C./min ramping and cooling rates) of about −50° C. to about 400° C., or about −50° C. to about 0° C., or about −25° C. to about 50° C., or about 0° C. to about 150° C., or about 100° C. to about 250° C., or about 150° C. to about 300° C., or about 200° C. to about 400° C. For example, water-soluble polymer 102 may have a glass transition temperature (ASTM E1356-08(2014) with 10° C./min ramping and cooling rates) of about 75° C. to about 85° C.

Mixture 110 is then processed 112 by applying sufficient shear to produce liquefied droplets of water-soluble polymer 102 at a temperature greater than the melting point or softening temperature of the water-soluble polymer 102, thereby forming melt emulsion 114. Without being limited by theory, it is believed that, all other factors being the same, increasing shear may decrease the size of the liquefied droplets in carrier fluid 104. It is to be understood that at some point there may be diminishing returns on increasing shear and decreasing the droplet size in turn and/or disruptions to the droplet contents that decrease the quality of particulates produced therefrom may occur at higher shear rates. Optional addition of surfactant may aid in stabilizing the liquefied droplets by lessening coalescence with other liquefied droplets, thereby aiding in maintaining a narrow particle size distribution once the particulates in a solidified state have formed.

Examples of mixing apparatuses used for producing melt emulsion 114 include, but are not limited to, extruders (e.g., continuous extruders, batch extruders and the like), stirred reactors, blenders, reactors with inline homogenizer systems, and the like, and apparatuses derived therefrom.

In non-limiting examples, the liquefied droplets may have a size of about 1 μm to about 1,000 μm, or about 1 μm to about 500 μm, or about 1 μm to about 150 μm, or about 1 μm to about 130 μm, or about 1 μm to about 100 μm, or about 10 μm to about 100 μm, or about 20 μm to about 80 μm, or about 20 μm to about 50 μm, or about 50 μm to about 90 μm. Particle size measurements may be made by analysis of optical images or using onboard software of a Malvern MASTERSIZER 3000 AERO S instrument, which uses light scattering techniques for particle size measurement.

For light scattering techniques, glass bead control samples with a diameter within the range of 15 μm to 150 μm under the tradename Quality Audit Standards QAS4002™ obtained from Malvern Analytical Ltd. may be used. Samples may be analyzed as dry powders dispersed in air using the dry powder dispersion module of the Mastersizer 3000 Aero S. Particle sizes may be derived using the instrument software from a plot of volume density as a function of size.

Melt emulsion 114 is then cooled 116 to solidify the liquefied droplets into particles in a solidified state, also referred to herein as "powder particulates". The cooling rate may range from about 100° C./sec to about 10° C./hour or about 10° C./sec to about 10° C./hr, including any cooling rate in between. Shear may be discontinued during cooling, or may be maintained at the same rate or a different rate during cooling. Cooled mixture 118 can then be treated 120 to isolate powder particulates 122 from other components 124 (e.g., carrier fluid 104, excess emulsion stabilizer 106, and the like). Washing, filtering and/or the like may be conducted at this stage to purify powder particulates 122 further. Powder particulates 122 comprise water-soluble polymer 102 and at least a portion of emulsion stabilizer 106 coating the outer surface of powder particulates 122. Nanoparticles and optionally surfactant may be associated with (disposed upon) the outer surface of powder particulates 122. Emulsion stabilizer 106, or a portion thereof, may be deposited as a uniform coating on powder particulates 122. In some instances, which may be dependent upon non-limiting factors such as the temperature (including cooling rate), the type of water-soluble polymer 102, and the types and sizes of emulsion stabilizer 106, the nanoparticles of emulsion stabilizer 106 may become at least partially embedded within the outer surface of powder particulates 122 in the course of becoming associated therewith. Even without embedment taking place, the nanoparticles within emulsion stabilizer 106 may remain robustly associated with powder particulates 122 to facilitate their further use. In contrast, dry blending already-formed powder particulates (e.g., formed by cryogenic grinding or precipitation processes) with a flow aid like silica nanoparticles may not result in a robust, uniform coating of the flow aid upon the powder particulates.

In the foregoing, water-soluble polymer 102 and carrier fluid 104 are chosen such that these components are immiscible or substantially immiscible (<5 wt. % solubility), particularly <1 wt. % solubility, at the various processing temperatures (e.g., from room temperature to the temperature at which liquefied droplets are formed and maintained as two or more phases).

After separating powder particulates 122 from other components 124, further processing 126 of powder particulates 122 may take place. In non-limiting examples, further processing 126 may include, for example, sieving powder particulates 122 and/or blending powder particulates 122 with other substances to form processed powder particulates 128. Processed powder particulates 128 may be formulated for use in a desired application.

Accordingly, melt emulsification processes of the present disclosure may comprise: combining a water-soluble polymer and nanoparticles with a carrier fluid at a heating temperature at or above a melting point or softening temperature of the water-soluble polymer; wherein the water-soluble polymer and the carrier fluid are substantially immiscible at the heating temperature; applying sufficient shear to disperse the water-soluble polymer as liquefied droplets in the carrier fluid at the heating temperature in the presence of the nanoparticles; after liquefied droplets have formed, cooling the carrier fluid to at least a temperature at which particulates in a solidified state form, the particulates comprising the water-soluble polymer and a plurality of the nanoparticles, the water-soluble polymer defining at least an outer surface of the particulates and at least a majority of the plurality of the nanoparticles being disposed upon the outer surface; and separating the particulates from the carrier fluid. In such processes, the water-soluble polymer and the carrier fluid are substantially immiscible at the heating temperature. In a particular example, the particulates may have a $D_{50}$ ranging from about 1 μm to about 150 μm, such as with size span of about 1.8 or less, such as a size span ranging from about 0.5 to about 1.8. Further, the particulates may have a geometric standard deviation (GSD) of about 3 or less, such as a GSD of about 1 to about 2.5, or about 1.2 to about 2.2, or about 1.2 to about 2.2, or about 1.2 to about 2.2, for example.

The particulates may have a bulk density of about 0.1 $g/cm^3$ to about 1.0 $g/cm^3$, or about 0.2 $g/cm^3$ to about 0.8 $g/cm^3$, or about 0.4 $g/cm^3$ to about 0.6 $g/cm^3$, or about 0.5 $g/cm^3$ to about 0.6 $g/cm^3$, or about 0.5 $g/cm^3$ to about 0.8 $g/cm^3$.

Shear sufficient to form liquefied droplets may be applied through stirring the carrier fluid in particular examples of the present disclosure. In non-limiting examples, the stirring rate may range from about 50 rotations per minute (RPM) to about 1500 RPM, or about 250 RPM to about 1000 RPM, or about 225 RPM to about 500 RPM, such as 100 RPM. The stirring rate while melting the water-soluble polymer may be the same as or different than the stirring rate used once liquefied droplets have formed. The liquefied droplets may be stirred over a stirring time of about 30 seconds to about 18 hours or longer, or about 1 minute to about 180 minutes, or about 1 minute to about 60 minutes, or about 5 minutes to about 6 minutes, or about 5 minutes to about 30 minutes, or about 10 minutes to about 30 minutes, or about 30 minutes to about 60 minutes.

Water-soluble polymers (including copolymers) suitable for use in the disclosure herein are not considered to be particularly limited. Suitable water-soluble polymers may include, for example, polyvinyl alcohol (PVA), polyethylene oxide (PEO), polyethylene glycol (PEG), poly (lactide-co-glycolide) (PLGA), or any combination thereof. Examples of polyvinyl alcohols suitable for use in the disclosure herein may include, for instance, POVAL™ 3-88, POVAL™ 5-88, POVAL™ 9-88, and POVAL™ 7-92. Some examples of water-soluble polymers may be suitable for use in the pharmaceutical and biomedical industries. Other water-soluble polymers more suitable for other applications may be chosen as needed.

Loading (concentration) of the water-soluble polymer in the carrier fluid may vary over a wide range. The loading in the carrier fluid may play at least some role in determining the properties of the particulates that are obtained following solidification of the liquefied droplets. In non-limiting examples, the loading of the water-soluble polymer in the carrier fluid may range from about 1 wt. % to about 99 wt. % relative to the weight of the carrier fluid. In more particular examples, the loading of the water-soluble polymer may range from about 5 wt. % to about 75 wt. %, or about 10 wt. % to about 60 wt. %, or about 20 wt. % to about 50 wt. %, or about 20 wt. % to about 30 wt. %, or about 30 wt. % to about 40 wt. %, or about 40 wt. % to about 50 wt. %, or about 50 wt. % to about 60 wt. %. The water-soluble polymer may be present in an amount ranging from about 5 wt. % to about 60 wt. %, or about 5 wt. % to about 25 wt. %, or about 10 wt. % to about 30 wt. %, or about 20 wt. % to about 45 wt. %, or about 25 wt. % to about 50 wt. %, or about 40 wt. % to about 60 wt. % relative to a combined amount of the water-soluble polymer and the carrier fluid (solids loading).

Various nanoparticles, particularly oxide nanoparticles, may be suitable for use in forming powder particulates of the present disclosure. Among the oxide nanoparticles that may be suitable for use in the disclosure herein include, for example, silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides such as aluminosilicates, borosilicates, and aluminoborosilicates, for example, are also encompassed by the term "oxide." The oxide nanoparticles may by hydrophilic or hydrophobic, which may be native to the nanoparticles or result from surface treatment of the nanoparticles. For example, silica nanoparticles having a hydrophobic surface treatment, like dimethylsilyl, trimethylsilyl, or the like, may be formed through reacting hydrophilic surface hydroxyl groups. Hydrophobically functionalized oxide nanoparticles may be desirable in the methods and compositions of the present disclosure for purposes of decreasing the dissolution rate of the water-soluble polymer in the powder particulates. Unfunctionalized oxide nanoparticles may also be suitable for use as well.

Silica nanoparticles, particularly fumed silica nanoparticles with a hydrophobic functionalization thereon, may be especially suitable for use in the disclosure herein, since a variety of functionalized silicas are available, with the type of hydrophobic functionalization and the particle size being variable. Silazane and silane are facile hydrophobic functionalizations that may be used in the present disclosure. As such, the plurality of oxide nanoparticles used in the disclosure herein may comprise or consist essentially of silica nanoparticles, particularly silica nanoparticles that are hydrophobically functionalized. Silica nanoparticles may be used in combination with another type of oxide nanoparticle or non-oxide nanoparticle when the other type of oxide or non-oxide nanoparticle may convey properties to the particulates, or an object formed therefrom, that are not attained when using silica nanoparticles alone.

Carbon black is another type of nanoparticle that may be present as an emulsion stabilizer in the compositions and methods disclosed herein. Various grades of carbon black will be familiar to one having ordinary skill in the art, any of which may be used herein.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. Crosslinked fluorinated polymers may be suitable in this regard. High molecular weight thermoplastic polymers having high melting or decomposition points may similarly comprise suitable polymer nanoparticle emulsion stabilizers.

When forming powder particulates according to the disclosure herein, the loading (concentration) and particle size of silica nanoparticles or other nanoparticles may vary over a wide range. The loading and particle size of the silica nanoparticles or other nanoparticles may play at least some role in determining the properties of the particulates that are obtained following solidification of the liquefied droplets. In non-limiting examples, loading of the silica nanoparticles in the carrier fluid may range from about 0.01 wt. % to about 20 wt. %, or about 0.05 wt. % to about 15 wt. %, or about 0.05 wt. % to about 10 wt. %, or about 0.05 wt. % to about 5 wt. %, with respect to the weight of the water-soluble polymer. In more particular examples, loading of the silica nanoparticles may range from about 0.01 wt. % to about 5 wt. %, or about 0.05 wt. % to about 2 wt. %, or about 0.1 wt. % to about 1.5 wt. %, or about 0.2 wt. % to about 1.0 wt. %, or about 0.25 wt. % to about 1 wt. %, or about 0.25 wt. % to about 0.5 wt. %, or about 0.05 wt. % to about 1 wt. %. Other types of nanoparticles, particularly oxide nanoparticles, may be used at similar loading ranges. The loading of nanoparticles within the powder particulates may fall within these ranges as well.

In non-limiting examples, the particle size of the silica nanoparticles may range from about 1 nm to about 150 nm, or about 1 nm to about 100 nm. In some instances, the particle size of the silica nanoparticles may be up to 500 nm. In more particular examples, the particle size of the silica nanoparticles may range from about 2 nm to about 150 nm, from about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. Other types of nanoparticles, particularly oxide nanoparticles, may be used at similar size ranges.

The nanoparticles, particularly silica nanoparticles and other oxide nanoparticles, may have a BET surface area of about 10 m$^2$/g to about 500 m$^2$/g, or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g.

Particular silica nanoparticles suitable for use in the disclosure herein may be hydrophobically functionalized. Such hydrophobic functionalization may make the silica nanoparticles less compatible with water than are unfunctionalized silica nanoparticles. In addition, the hydrophobic functionalization may improve dispersion of the silica nanoparticles in the carrier fluid, which may be highly hydrophobic. The hydrophobic functionalization may be non-covalently or covalently attached to a surface of the silica nanoparticles. Covalent attachment may take place, for example, through functionalization of surface hydroxyl groups on the surface of the silica nanoparticles. In a non-limiting example, silica nanoparticles may be treated with hexamethyldisilazane to afford covalent functionalization of a hydrophobic modification. Commercially available hydrophobically functionalized silica nanoparticles include, for example, AEROSIL® RX-50 (Evonik, average particle size=40 nm) and AEROSIL® R-812S (Evonik, average particle size=7 nm).

It is to be appreciated, however, that unfunctionalized silica nanoparticles may also be suitably used as an emulsion stabilizer in the disclosure herein.

Upon forming powder particulates according to the disclosure herein, at least a portion of the nanoparticles, such as silica nanoparticles, may be disposed as a coating upon the outer surface of the powder particulates. The coating may be disposed substantially uniformly upon the outer surface, as assessed by visual observation of the particulates. As used herein with respect to a coating, the term "substantially uniform" refers to even coating thickness in surface locations covered by the nanoparticles, particularly the entirety of the outer surface. Coating coverage, including nanoparticles upon the powder particulates may range from about 5% to about 100%, or about 5% to about 25%, or about 20% to about 50%, or about 40% to about 70%, or about 50% to about 80%, or about 60% to about 90%, or about 70% to about 100% of the surface area of the particulates. Coverage may be determined by image analysis of SEM micrographs. The water-soluble polymer may comprise about 90 wt. % to about 99.5 wt. % of the powder particulates disclosed herein.

The particulates of the present disclosure may comprise about 0.05% to about 5%, or about 0.05% to about 4.5%, or about 0.1% to about 4%, or about 0.15% to about 3.5% silica nanoparticles by weight. Other types of nanoparticles suitable for use as emulsion stabilizers may be present upon the particulates at similar loadings.

Carrier fluids suitable for use in the disclosure herein include those in which the water-soluble polymer is substantially immiscible with the carrier fluid, the carrier fluid has a boiling point exceeding the melting point or softening temperature of the water-soluble polymer, and the carrier fluid has sufficient viscosity to form liquefied droplets of substantially spherical shape once the water-soluble polymer has undergone melting or softening therein. Suitable carrier fluids may include, for example, silicone oil, fluorinated silicone oils, perfluorinated silicone oils, polyethylene glycols, alkyl-terminal polyethylene glycols (e.g., $C_1$-$C_4$ terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxyalkylenes, and the like, and any combination thereof.

Suitable carrier fluids may have a density of about 0.6 g/cm$^3$ to about 1.5 g/cm$^3$, and the water-soluble polymer may have a density of about 0.7 g/cm$^3$ to about 1.7 g/cm$^3$, wherein the water-soluble polymer has a density similar to, lower than, or higher than the density of the carrier fluid.

Particularly suitable silicone oils are polysiloxanes. Illustrative silicone oils suitable for use in the disclosure herein include, for example, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like and any combination thereof.

In non-limiting examples, the carrier fluid and the water-soluble polymer may be heated at a temperature of about 200° C. or above. Suitable heating temperatures may be chosen based upon the melting point or softening temperature of the water-soluble polymer and the boiling point of the carrier fluid. The cooling rate following formation of liquefied polymer droplets may be varied as desired. In some instances, cooling may take place with heat dissipation to the surrounding environment taking place at an innate (uncontrolled) rate once heating is discontinued. In other cases, cooling at a controlled rate (e.g., by gradually decreasing the heating temperature and/or using jacketed temperature control to increase or decrease the rate of cooling may be employed.

Carrier fluids, such as polysiloxanes, including PDMS, may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. The viscosity of the carrier fluid may be obtained from commercial suppliers or it may be measured, if desired, through techniques known to persons having ordinary skill in the art.

Separating the powder particulates from the carrier fluid may take place by any of a variety of known separation techniques. Any of gravity settling and filtration, decantation, centrifugation, or the like may be used to separate the powder particulates from the carrier fluid. The powder particulates may be washed with a solvent in which the carrier fluid is soluble and the powder particulates are insoluble in the course of the separation process. In addition, a solvent in which the carrier fluid is soluble and the powder particulates are insoluble may be mixed with the carrier fluid and the powder particulates before initially separating the powder particulates from the carrier fluid.

Suitable solvents for washing the powder particulates or mixing with the carrier fluid may include, but are not limited to, aromatic hydrocarbons (e.g., toluene and/or xylene), aliphatic hydrocarbons (e.g., heptane, n-hexane, and/or n-octane), cyclic hydrocarbons (e.g., cyclopentane, cyclohexane, and/or cyclooctane), ethers (e.g. diethyl ether, tetrahydrofuran, diisopropyl ether, and/or dioxane), halogenated hydrocarbons (e.g., dichloroethane, trichloroethane, dichloromethane, chloroform and/or carbon tetrachloride), alcohols (e.g., methanol, ethanol, isopropanol, and/or n-propanol), ketones (e.g., methyl ethyl ketone and/or acetone); esters (e.g., ethyl acetate and the like), water, the like, and any combination thereof.

After washing the powder particulates, any of heating, vacuum drying, air drying, or any combination thereof may be performed.

Advantageously, carrier fluids and/or washing solvents of the systems and methods described herein can be recycled and reused, if desired.

In spite of washing the powder particulates with a solvent, a limited quantity of the carrier fluid may remain in some instances. In non-limiting examples, any of the powder particulates of the present disclosure may comprise a non-zero amount up to about 5 wt. % carrier fluid that remains associated with the plurality of powder particulates. The carrier fluid may be associated with the outer surface of the powder particulates and/or trapped within voids or cavities within the powder particulates. The amount of voids present may influence the amount of carrier fluid retained by the particulates, as well as the dissolution rate. When they occur, up to about 35 vol. % voids, or up to about 20 vol. % voids, or up to about 10 vol. % voids, or up to about 5 vol. % voids may be present in the powder particulates, with the voids being filled or unfilled.

At least a majority of the powder particulates obtained according to the disclosure here may be substantially spherical in shape. More typically, about 90% or greater, or about 95% or greater, or about 99% or greater of the powder particulates produced by melt emulsification according to the present disclosure may be substantially spherical in shape. In non-limiting examples, the powder particulates of the present disclosure may have a sphericity (circularity) of about 0.9 or greater, including about 0.90 to about 1.0, or about 0.93 to about 0.99, or about 0.95 to about 0.99, or about 0.97 to about 0.99, or about 0.98 to about 1.0. Sphericity (circularity) may be measured using a Sysmex FPIA-2100 Flow Particle Image Analyzer. To determine circularity, optical microscopy images are taken of the particulates. The perimeter (P) and area (A) of the particulates in the plane of the microscopy image is calculated (e.g., using a Sysmex FPIA 3000 particle shape and particle size analyzer, available from Malvern Instruments). The circularity of the particulate is $C_{EA}/P$, where $C_{EA}$ is the circumference of a circle having the area equivalent to the area (A) of the actual particulate.

The powder particulates of the present disclosure may have an angle of repose of about 25° to about 45°, or about 25° to about 35°, or about 30° to about 40°, or about 35° to about 45°. Angle of repose may be determined using a Hosokawa Micron Powder Characteristics Tester PT-R using ASTM D6393-14 "Standard Test Method for Bulk Solids" Characterized by Carr Indices."

In addition, the powder particulates formed according to the disclosure herein may have a plurality of silica nanoparticles or other nanoparticles that are at least partially embedded in the outer surface defined by the water-soluble polymer. When the silica nanoparticles or other nanoparticles are at least partially embedded in the outer surface, a portion of the nanoparticle structure may be located in a crater or depression in the outer surface, thereby making it more difficult to dislodge the nanoparticles from the surface. It is to be appreciated that even when substantial embedment does not occur, appropriately functionalized nanoparticles, such as hydrophobically functionalized silica nanoparticles, may non-covalently associate (e.g., in a van der Waals-type interaction) to promote retention of the nanoparticles upon the outer surface.

Powder particulates isolated from the carrier fluid according to the disclosure above may be further processed to make the powder particulates suitable for an intended application. In some examples, the powder particulates may be passed through a sieve or similar structure having an effective screening size that is greater than the average particle size of the powder particulates. For example, an illustrative screening size for processing powder particulates may be about 150 µm. When referring to sieving, pore/screen sizes are described per U.S.A. Standard Sieve (ASTM E11-17). Other screening sizes, either larger or smaller, may be more suitable for particulates destined for use in various applications. Sieving may remove larger particulates that may have formed during the melt emulsification process and/or remove agglomerated particulates that may have poor flow characteristics. In general, sieves having an effective screening size ranging from about 10 µm to about 250 µm may be used.

In addition, the powder particulates passing through the sieve or a similar structure may be mixed with one or more additional components such as flow aids, fillers or other substances intended to tailor the properties of the powder particulates for an intended application. Mixing of the additional components with the powder particulates may be conducted by dry blending techniques. Suitable examples of flow aids (e.g., carbon black, graphite, silica, and the like) and similar substances will be familiar to one having ordinary skill in the art.

In view of the foregoing, the present disclosure further provides compositions comprising powder particulates bearing a coating comprising nanoparticles, particularly oxide nanoparticles. The compositions may comprise a plurality of particulates comprising a water-soluble polymer and a plurality of nanoparticles, particularly oxide nanoparticles, in which the water-soluble polymer defines at least an outer surface of the particulates and the plurality of nanoparticles are disposed upon the outer surface. In particular examples, the particulates may have a $D_{50}$ ranging from about 1 µm to about 150 µm with a geometric standard deviation (GSD) of about 3 or less, or about 0.5 to about 3, or about 0.75 to about 2.75, or about 1 to about 2.5, or about 1.25 to about 2.25, or about 1.5 to about 2.

As discussed herein, the nanoparticles upon the outer surface of the powder particulates may be metal nanoparticles or non-metal nanoparticles, particularly silica nanoparticles or other oxide nanoparticles. Silica nanoparticles bearing hydrophobic functionalization, either alone or in combination with other types of nanoparticles, may be particularly desirable as an emulsion stabilizer that becomes associated with the outer surface of the powder particulates.

Sizes of the powder particulates that may be produced according to the disclosure herein are not considered to be particularly limited, but may be about 150 µm or less in size of 125 µm or less in size, or 100 µm or less in size in order to facilitate use in various applications, such as three-dimensional printing or other types of applications in which particulates are used. Particularly suitable powder particulates may have a $D_{50}$ ranging from about 1 µm in size to about 150 µm in size, as referenced above. Particle size measurements may be made using a Malvern MASTERSIZER 3000 AERO S instrument. Various factors such as the size, type and loading of nanoparticles, the shear rate, the heating temperature, the cooling rate, the carrier fluid and its viscosity, and the particular water-soluble polymer used, as non-limiting examples, may also impact the size and/or particle size distribution of the powder particulates obtained according to the present disclosure. One or more of these factors may also determine the sphericity of the powder particulates and/or whether the carrier fluid is retained within the powder particulates in a non-zero amount.

In still additional non-limiting embodiments, the compositions disclosed herein may further comprise a flow aid or additional components that may facilitate use of the powder particulates in a desired application. Suitable examples of each will be familiar to one having ordinary skill in the art.

Any of the powder particulates disclosed herein may be formulated in a composition suitable for pharmaceutical and biomedical applications, such as through adjusting the release rate of a drug by slowing the polymer dissolution rate (e.g., as a solubility modifier for tablet formulations), for example. Other applications for the powder particulates of the present disclosure may include, but are not limited to, as a water-soluble drug/therapeutic agent matrix, water-dispersible pesticide granules, a solubility-controlled powder for 3D printing (e.g., for powder bed fusion), and solubility-controlled microparticles for paint formulations, and the like.

Embodiments disclosed herein include:

A. Powder particulate compositions. The powder particulate compositions comprise: a plurality of particulates comprising a water-soluble polymer and a plurality of nanoparticles, the water-soluble polymer defining at least an outer surface of the particulates and at least a majority of the plurality of nanoparticles being disposed upon the outer surface.

B. Powder particulate compositions comprising polyvinyl alcohol. The powder particulate compositions comprise: a plurality of particulates comprising a polyvinyl alcohol and a plurality of silica nanoparticles that are hydrophobically functionalized, the polyvinyl alcohol defining at least an outer surface of the particulates and at least a majority of the plurality of silica nanoparticles being disposed upon the outer surface; wherein the particulates are substantially spherical and have an average size ($D_{50}$) ranging from about 1 μm to about 150 μm with a geometric standard deviation (GSD) of about 3 or less.

C. Methods for making powder particulate compositions. The methods comprise: combining a water-soluble polymer and nanoparticles with a carrier fluid at a heating temperature at or above a melting point or softening temperature of the water-soluble polymer; wherein the water-soluble polymer and the carrier fluid are substantially immiscible at the heating temperature; applying sufficient shear to disperse the water-soluble polymer as liquefied droplets in the carrier fluid at the heating temperature in the presence of the nanoparticles; after liquefied droplets have formed, cooling the carrier fluid to at least a temperature at which particulates in a solidified state form, the particulates comprising the water-soluble polymer and a plurality of the nanoparticles, the water-soluble polymer defining at least an outer surface of the particulates and at least a majority of the plurality of the nanoparticles being disposed upon the outer surface; and separating the particulates from the carrier fluid.

Embodiments A, B and C may include one or more of the following elements in any combination:

Element 1: wherein the water-soluble polymer is selected from the group consisting of polyvinyl alcohol (PVA), polyethylene oxide (PEO), polyethylene glycol (PEG), poly(lactide-co-glycolide) (PLGA), and any combination thereof.

Element 2: wherein the water-soluble polymer comprises polyvinyl alcohol (PVA).

Element 3: wherein the plurality of nanoparticles comprises or consists essentially of a plurality of oxide nanoparticles, carbon black, or any combination thereof.

Element 4: wherein the plurality of nanoparticles comprises silica nanoparticles.

Element 5: wherein the silica nanoparticles have a $D_{50}$ ranging from about 2 nm to about 150 nm.

Element 6: wherein the plurality of nanoparticles is hydrophobically functionalized.

Element 7: wherein at least a majority of the plurality of particulates are substantially spherical in shape, with a $D_{50}$ ranging from about 1 μm to about 150 μm.

Element 8: wherein the plurality of particulates has a circularity of about 0.9 to about 1.

Element 9: wherein the plurality of particulates comprises about 0.05% to about 5% nanoparticles by weight.

By way of non-limiting example, exemplary combinations applicable to A, B and C include, but are not limited to, 1 or 2, and 3; 1 or 2, and 4; 1 or 2, 4 and 5; 1 or 2, and 6; 1 or 2, and 7; 1 or 2, and 8; 1 or 2, 4 and 9; 1 or 2, 4 and 6; 1 or 2, 7 and 8; 3 or 4, and 5; 3 or 4, and 6; 3 or 4, and 7; 3 or 4, and 8; 3 or 4, and 9; 4 and 5, and 6; 4 and 5, and 7; 4 and 5, and 8; 4 and 5, and 9; 6 and 7; 6 and 8; 6 and 9; 7 and 8; 7 and 9; and 8 and 9.

To facilitate a better understanding of the embodiments of the present disclosure, the following examples of preferred or representative embodiments are given. In no way should the following examples be read to limit, or to define, the scope of the disclosure.

EXAMPLES

In the examples below, average particle size ($D_{50}$), $D_{10}$ and $D_{90}$ measurements were made using a Malvern MASTERSIZER 3000 particle size analyzer.

The water-soluble polymers were compounded by melt mixing in a HAAKE™ RHEOMIX batch mixer with high shear rotors.

POVAL™ 5-88 (a semi-crystalline polyvinyl alcohol (PVA) polymer, partially hydrolyzed (about 88% hydrolyzed) and a melting point of 220° C., available from Kuraray) was used to form powder particulates in the disclosure below. AEROSIL® RX-50 (a hydrophobic special fumed silica treated with hexamethyldisilazane (HMDS), available from Evonik) was used as an emulsion stabilizer.

Three types of powder particulates were prepared: (1) virgin particles comprising PVA without any AEROSIL® RX-50 treatment (Comparative Example 1), (2) particles comprising PVA with 0.5% w/w AEROSIL® RX-50 (Example 1), and (3) particulates comprising PVA with 1.0% w/w AEROSIL® RX-50 (Example 2).

Comparative Example 1. PVA Powder Particulates. Virgin POVAL™ 5-88 was used in this example. Approximately 35.0 g of PDMS with a kinematic viscosity of 60,000 cSt, was added to a HAAKE™ RHEOMIX batch mixer, and mixed at 100 RPM for 5 minutes, at 240° C. 15 g PVA was slowly dosed to the extruder over 2-3 minutes. After complete addition of the PVA, the mixer was sealed and mixed for 10 minutes to form dispersed microparticles. The resulting slurry was then discharged onto dry ice and washed with heptane. The powder particulates were very granular and not able to be sieved through a 150 μm sieve.

Figure 2:
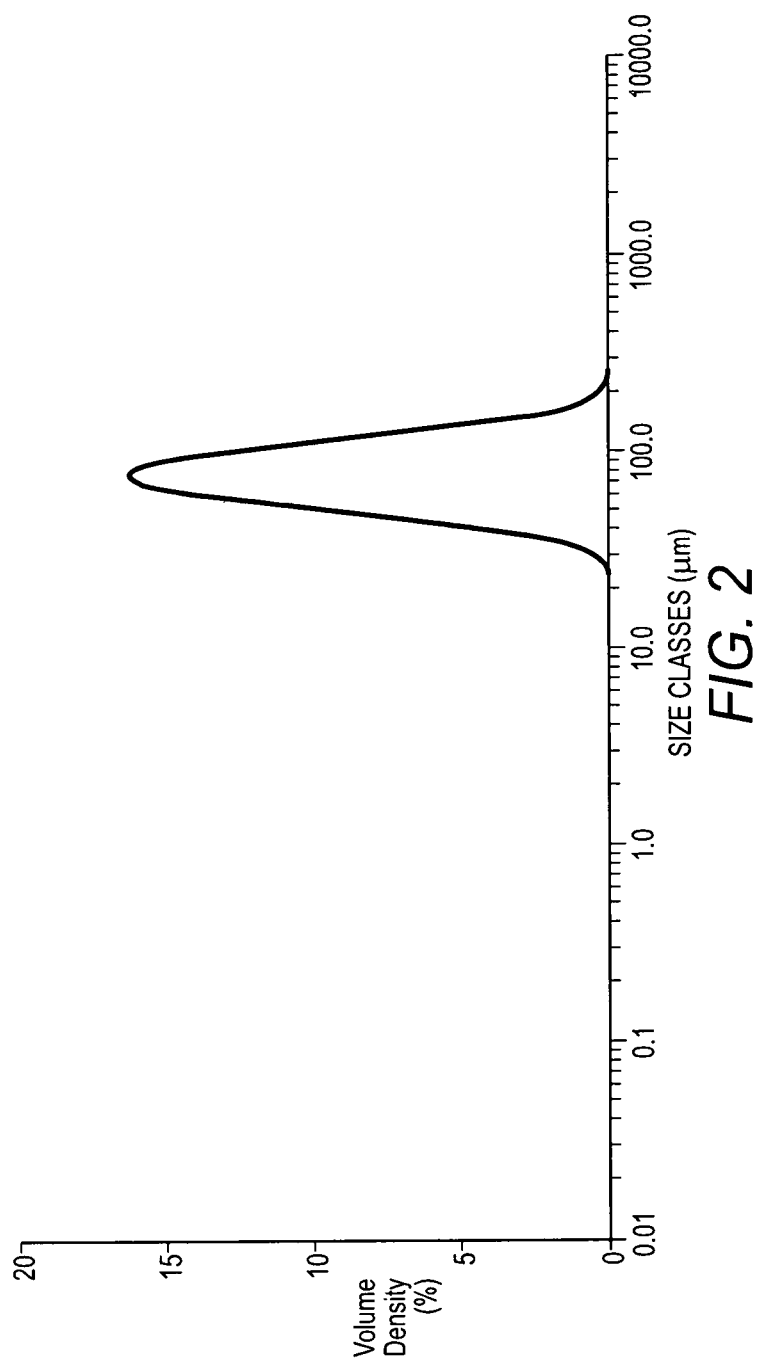
FIG. 2 shows an illustrative histogram of the particle sizes of powder particulates obtained in Example 1.

Example 1. PVA Powder Particulates coated with 0.5% w/w AEROSIL® RX-50. Silica-coated powder particulates were prepared in the same manner as Comparative Example 1, except 0.07 g AEROSIL® RX-50 silica nanoparticles were mixed with the PDMS prior to adding the PVA. The resulting powder particulates were sievable and exhibited a narrow particle size distribution. FIG. 2 shows an illustrative histogram of the particle size of powder particulates obtained in Example 1.

Example 2. PVA Powder Particulates Coated with 1.0% w/w AEROSIL® RX-50. Example 1 was repeated with a higher loading of AEROSIL® RX-50 (0.15 g).

Dissolution Properties. Dissolution properties of the three foregoing powder particulate samples were determined by combining 0.125 g of the powder particulates with water and observing the dissolution rate over time. At 5 minutes, the uncoated powder particulates (Comparative Example 1) had partially dissolved, whereas no dissolution was evident for the coated powder particulates (Examples 1 and 2). At 3 hours, all three samples had completely dissolved, but the uncoated powder particulates afforded a cloudier solution than did the coated particulates.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A composition comprising:
a plurality of particulates comprising a water-soluble polymer and a plurality of nanoparticles, the water-soluble polymer defining at least an outer surface of the particulates and at least a majority of the plurality of nanoparticles being disposed upon the outer surface; wherein the particulates range from about 20 μm to about 150 μm in size.

2. The composition of claim 1, wherein the water-soluble polymer is selected from the group consisting of polyvinyl alcohol (PVA), polyethylene oxide (PEO), polyethylene glycol (PEG), poly (lactide-co-glycolide) (PLGA), and any combination thereof.

3. The composition of claim 1, wherein the water-soluble polymer comprises polyvinyl alcohol (PVA).

4. The composition of claim 1, wherein the plurality of nanoparticles comprises or consists essentially of a plurality of oxide nanoparticles, carbon black, or any combination thereof.

5. The composition of claim 1, wherein the plurality of nanoparticles comprises silica nanoparticles.

6. The composition of claim 5, wherein the silica nanoparticles have a D50 ranging from about 2 nm to about 150 nm.

7. The composition of claim 1, wherein the plurality of nanoparticles is hydrophobically functionalized.

8. The composition of claim 1, wherein at least a majority of the plurality of particulates are substantially spherical in shape.

9. The composition of claim 1, wherein the plurality of particulates has a circularity of about 0.9 to about 1.

10. The composition of claim 1, wherein the plurality of particulates comprises about 0.05% to about 5% nanoparticles by weight.

11. A composition comprising:
a plurality of particulates comprising a polyvinyl alcohol and a plurality of silica nanoparticles that are hydrophobically functionalized, the polyvinyl alcohol defining at least an outer surface of the particulates and at least a majority of the plurality of silica nanoparticles being disposed upon the outer surface;
wherein the particulates are substantially spherical and have an average size ($D_{50}$) ranging from about 1 μm to about 150 μm with a geometric standard deviation (GSD) of about 3 or less.

12. A method comprising:
combining a water-soluble polymer and nanoparticles with a carrier fluid at a heating temperature at or above a melting point or softening temperature of the water-soluble polymer;
wherein the water-soluble polymer and the carrier fluid are substantially immiscible at the heating temperature;
applying sufficient shear to disperse the water-soluble polymer as liquefied droplets in the carrier fluid at the heating temperature in the presence of the nanoparticles;
after liquefied droplets have formed, cooling the carrier fluid to at least a temperature at which particulates in a solidified state form, the particulates comprising the water-soluble polymer and a plurality of the nanoparticles, the water-soluble polymer defining at least an outer surface of the particulates and at least a majority of the plurality of the nanoparticles being disposed upon the outer surface;
wherein the particulates range from about 20 μm to about 150 μm in size; and
separating the particulates from the carrier fluid.

13. The method of claim 12, wherein the water-soluble polymer is selected from the group consisting of polyvinyl alcohol (PVA), polyethylene oxide (PEO), polyethylene glycol (PEG), poly (lactide-co-glycolide) (PLGA), and any combination thereof.

14. The method of claim 12, wherein the water-soluble polymer comprises polyvinyl alcohol (PVA).

15. The method of claim 12, wherein the plurality of nanoparticles comprises or consists essentially of a plurality of oxide nanoparticles, carbon black, or any combination thereof.

16. The method of claim 12, wherein the plurality of nanoparticles comprises silica nanoparticles.

17. The method of claim 16, wherein the silica nanoparticles have a D50 ranging from about 2 nm to about 150 nm.

18. The method of claim 12, wherein the plurality of nanoparticles is hydrophobically functionalized.

19. The method of claim 12, wherein at least a majority of the plurality of particulates are substantially spherical in shape.

20. The method of claim 12, wherein the plurality of particulates comprises about 0.05% to about 5% nanoparticles by weight.

* * * * *